Jan. 31, 1956 W. G. CASSADY ET AL 2,732,822
INDEX DEVICE
Filed Nov. 20, 1952
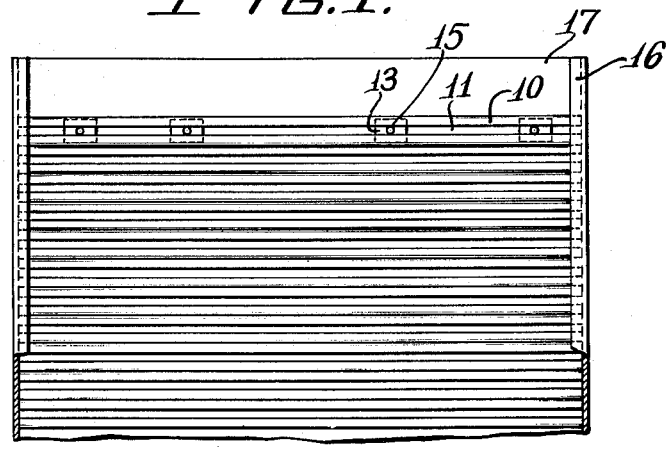
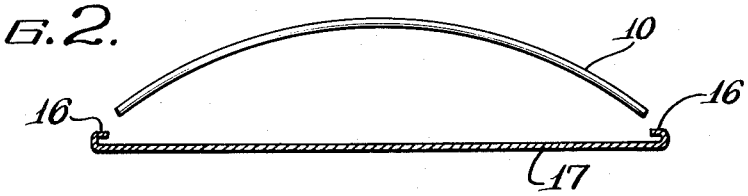
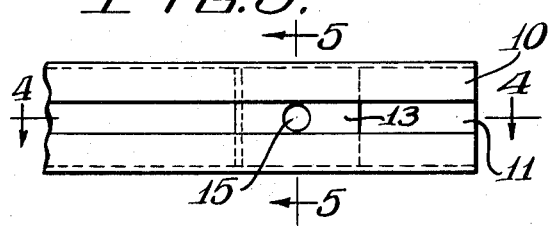
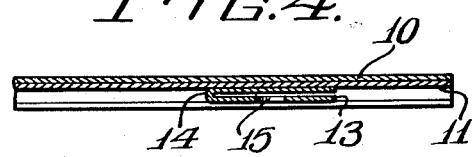
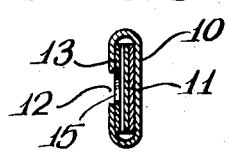
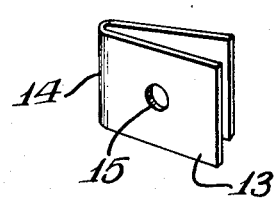
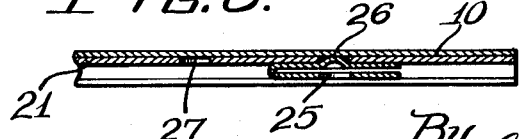
Inventors:
Walter G. Cassady
Theodore O. Perkins
By Gary, Desmond & Parker
Attys.

United States Patent Office 2,732,822
Patented Jan. 31, 1956

2,732,822

INDEX DEVICE

Walter G. Cassady, Charlottesville, and Theodore O. Perkins, Crozet, Va., assignors to Acme Visible Records, Inc., Chicago, Ill., a corporation of Delaware Application November 20, 1952, Serial No. 321,624

3 Claims. (Cl. 116—135)

This invention relates to improvements in visible index means and to the combination therewith of novel slidable signal means.

The present invention relates to improvements in index devices of the class wherein a plurality of flexible strips, adapted to receive indexing data, are mounted in side by side relationship in a flanged frame or holder. More particularly, the present invention relates to the foregoing class of index means wherein thin strips of paper adapted to receive indexing data, or which are partially imprinted with such indicia, are inserted in flexible transparent tubes, and these tubes, upon foreshortening by flexing, are endwise inserted beneath longitudinally extending flanges on the holders or frames.

It is an object of the present invention to provide such index means with slidable signals for cooperative relationship with the indicia on the strips contained within the transparent tubes, in a novel construction and arrangement whereby ready access may be had to the signal for the purpose of setting or resetting it in desired relationship to the indicia on the index strip in a quick and convenient manner, and without danger of obliteration or marring of the said indicia.

It is a further object to provide such index means with signals which although slidable are securely retained in desired setting without danger of accidental or undesired displacement.

Other objects and advantages, including the details of construction and arrangement of parts, will be apparent from a consideration of the following specification and drawings, where in:

Fig. 1 is a fragmentary, front, elevational view, with parts broken away, showing a visible index frame with our index strips and signals mounted therein.

Fig. 2 is a cross-sectional view of the frame of Fig. 1, further illustrating a signal strip tube in flexed position for insertion in the frame.

Fig. 3 is a fragmentary, enlarged, front elevational view of one of our slidable signals disposed within a flexible transparent tube.

Fig. 4 is a section on the line 4—4 of Fig. 3.

Fig. 5 is a section on the line 5—5 of Fig. 3.

Fig. 6 is a perspective view of one form of our slidable signals.

Fig. 7 is as cross-sectional view of a modified form of our slidable signals.

Fig. 8 is a sectional view similar to that of Fig. 4, but ilustrating in combination the use of the signal of Fig. 7.

Referring to the drawings, the reference numeral 10 indicates a transparent flexible tube composed of a material such as, for example, cellulose acetate. This tube is flattened and is adapted to embrace and receive a strip 11 of paper on which may be typed or otherwise marked indexing data. Conventionally these index strips bear at least in part printed matter and marked divisions pertinent to a particular business system, for the purpose of indicating dates, periods, quantities, credit information, and the like.

In accordance with present invention, these flattened tubes are further provided with a slot 12 extending longitudinally of the face of the tube, leaving a space adequate for insertion of the tip of a pencil or stylus. These thus slotted tubes may be formed by actually cutting tubular material to form the desired slot, or by folding flat strips of transparent flexible material to the desired shape; that is, by return bending the longitudinal edges of the strip, leaving the overfolded portions spaced at their opposed edges and slightly elevated from the resulting base portion to an extent adequate to receive the paper index strip 11 and the slidable signal generally indicated as 13. The index strips 11 may be inserted endwise in a tube 10 or less conveniently through the slot 12 thereof.

The slidable signal 13 is composed of a strip of folded material, colored to provide contrast, and may be of paper or plastic and of an opaque or translucent character of desired size and thickness. It is preferred to employ colored translucent plastic material of suitable thickness so that a fairly rigid, self-sustaining but flexible and resilient body will be provided. As shown in Fig. 6, in one embodiment of our invention, the signal 13 is composed of strip having a width adapted to be received snugly but slidably between the upper and lower confines of tube 10. The strip may be of any desired length and is doubled over on itself at the fold or hinge line 14. A strip of paper, particularly a strip of plastic material such as, for example, cellulose acetate, when folded in this manner, will normally tend to spring open at its opposed ends by reason of residual resiliency, and, if desired, when employing a strip of resilient plastic, the degree of bending on the line 14 may be controlled so as to permit the ends to remain normally spaced to an appreciable degree so that the effect is substantially that of a plate spring. One of the two sections of this slidable signal is formed with an aperture 15, the other being left imperforate.

When this folded signal is inserted into the slotted tube 10, above a contained index strip 11, it may be moved to desired signalling position by means of a pencil tip or stylus inserted through slot 12 and into aperture 13. By reason of the imperforate back section of the signal strip, repeated use will not scratch or mar the signal strip 11. Further by reason of the spring-like character and tendency of the sections of the signal to spread in a wedge-like manner, frictional engagement is set up within the tube so as to permit firm setting of the signal without danger of unintentional displacement. After assembly, the slotted tube 10 and its contents may be bent as shown in Fig. 2, and its ends positioned beneath the flanges 16 of the frame 17 for use.

Figs. 7 and 8 illustrate a modfiied form of construction providing interlocking engagement between a slidable signal 23 and a signal strip 21. The signal 23 is constructed like the signal 13, and is likewise provided with an aperture 25 positioned to register with the slot 12 in tube 10. In this form, however, the opposed leaf of the signal is formed with an outwardly projecting dimple 26 in registry with the aperture 25. For use with this form of signal, the index strip 21 is formed with one or more perforations 27 in cooperative relationship to indicia borne or placed on the index strip 21, and disposed for reception of a dimple 26. With this modified form of construction, it will be apparent that the slidable signal 23 may be moved by means of a pencil tip or stylus as in the case of signal 13, and in addition more positive retention of the slidable signal in desired fixed position may be obtained.

Although we have shown and described the preferred embodiments of our invention, it will be understood by those skilled in the art that various modifications may be made in the details thereof without departing from the

We claim as our invention:

1. Index means comprising an elongated relatively flat tube of transparent flexible material, an elongated index strip embraced therein, and a slidable signal frictionally engaged within said tube and disposed above said strip for signalling relationship therewith, said signal being formed of a medially folded strip of flexible resilient material of contrasting color to said tube to provide a face portion formed with an aperture and an imperforate back portion, said signal portions being frictionally retained in said tube by residual resiliency at their line of fold urging them apart, said tube being formed with a longitudinally extending slot providing access to the aperture in the face portion of the signal whereby it may be engaged by a stylus and moved longitudinally of said tube.

2. Index means comprising an elongated relatively flat tube of transparent flexible material, an elongated index strip embraced therein, and a slidable signal frictionally engaged within said tube and disposed above said strip for signalling relationship therewith, said signal being formed of a medially bent strip of material to provide a face portion formed with an aperture and an imperforate back portion, said tube being formed with a longitudinal slot providing access to the aperture in the face portion of the signal whereby it may be engaged and moved longitudinally of said tube, said imperforate signal back portion being formed with a rearwardly projecting dimple in registry with the aperture in the face portion of the signal, and said signal strip being formed with a perforation for reception of said dimple and to thereby provide relative interlocking engagement between said slidable signal and said index strip.

3. Index means comprising an elongated relatively flat tube of transparent flexible material, an elongated index strip embraced therein, and a slidable signal frictionally engaged within said tube and disposed above said strip for signalling relationship therewith, said signal being formed of a medially folded strip of flexible resilient material of contrasting color to said tube to provide a face portion formed with an aperture and an imperforate back portion, said signal portions being frictionally retained in said tube by residual resiliency at their line of fold urging them apart, said tube being formed with a longitudinally extending slot providing access to the aperture in the face portion of the signal whereby it may be engaged by a stylus and moved longitudinally of said tube, said imperforate signal back portion being formed with a rearwardly projecting dimple in registry with the aperture in the face portion of the signal and said signal strip being formed with a plurality of longitudinally spaced perforations for reception of said dimple and to thereby provide relative interlocking engagement between said slidable signal and said index strip.

References Cited in the file of this patent

UNITED STATES PATENTS

| | | |
|---|---|---|
| 1,227,661 | Rand | May 29, 1917 |
| 1,866,353 | Hutchings | July 5, 1933 |
| 2,356,332 | Malmer | Aug. 22, 1944 |
| 2,391,080 | Vaucher | Dec. 18, 1945 |
| 2,480,686 | Aigner | Aug. 30, 1949 |
| 2,527,901 | Wassell | Oct. 31, 1950 |

FOREIGN PATENTS

| | | |
|---|---|---|
| 160,457 | Switzerland | May 1, 1933 |